Oct. 20, 1959 S. B. BROWN 2,909,397
ROTARY PUMP
Filed July 1, 1955 2 Sheets-Sheet 1
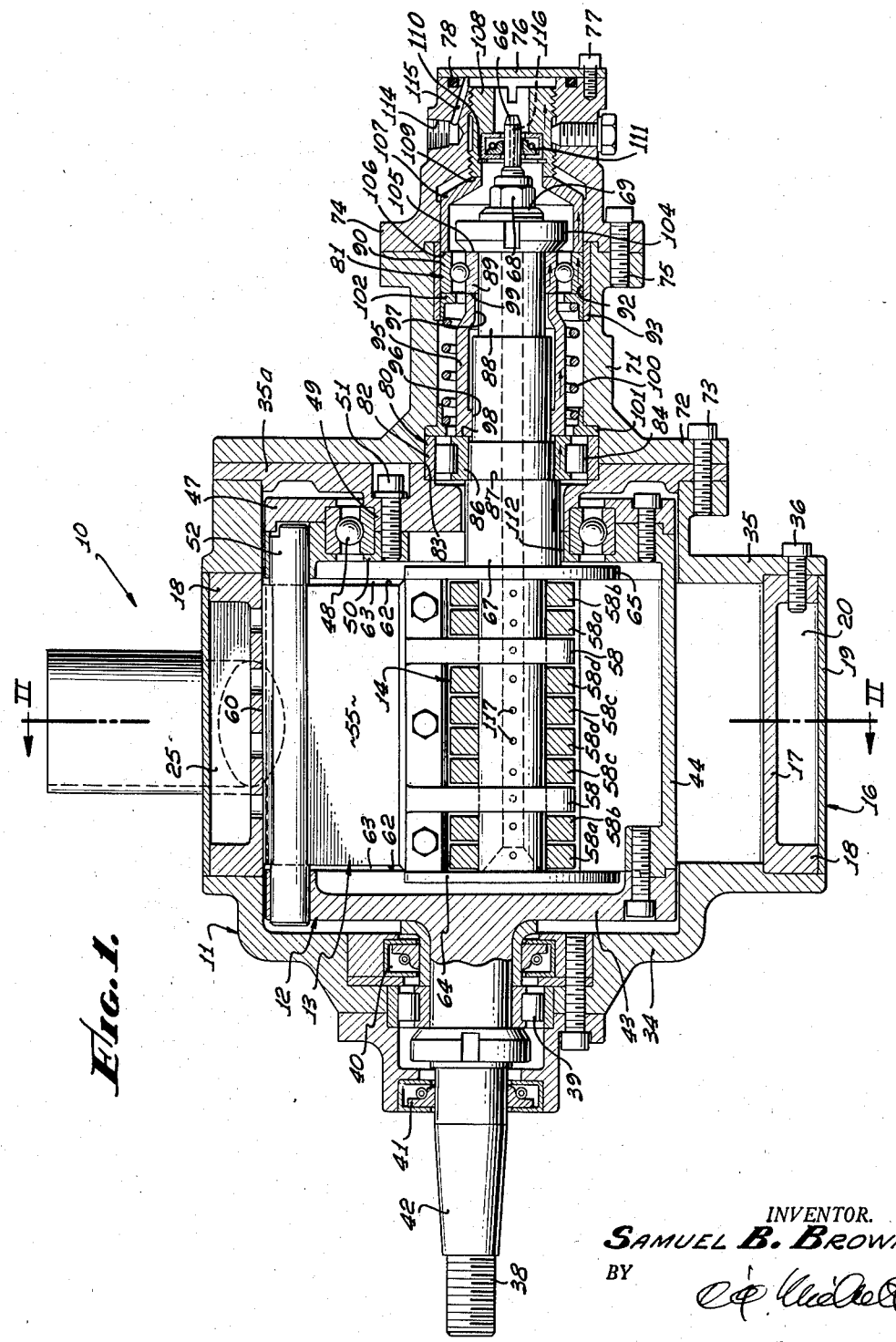
Fig. 1.
INVENTOR.
SAMUEL B. BROWN
BY
ATTORNEY.

Oct. 20, 1959  S. B. BROWN  2,909,397
ROTARY PUMP
Filed July 1, 1955  2 Sheets-Sheet 2

INVENTOR.
SAMUEL B. BROWN
BY
ATTORNEY.

United States Patent Office

2,909,397
Patented Oct. 20, 1959

2,909,397

ROTARY PUMP

Samuel B. Brown, Los Angeles, Calif.

Application July 1, 1955, Serial No. 519,338

6 Claims. (Cl. 308—189)

This invention relates generally to a rotary pump adaptable for use as a pump for fluid, such as air, gas or liquid. The construction of the rotary pump of this invention may also be utilized as a compressor or an engine.

The present invention is particularly applicable in construction wherein an antifrictionally mounted rotatable rotor means, associated with stationary means, is provided longitudinal or axial adjustment to provide selected end clearance or selected relative positioning thereof with respect to the stationary means. An exemplary of the invention embodies pump constructions similar to that disclosed in my United States Letters Patent No. 2,001,011, issued May 14, 1935. The rotary pump of the present invention includes a spindle means mounted in a pair of bearing means. One bearing means is slidably adjustable in response to axially directed selectively applied forces to urge the spindle means relative to an associated stationary means and to thus selectively, axially position rotor means carried by the spindle means.

An object of this invention is to disclose and provide a novel means for mounting a rotor means to permit longitudinal or axial adjustment thereof with respect to an associated longitudinally non-adjustable means.

A further object of this invention is to disclose and provide such a novel means for mounting a rotatable spindle means wherein a pair of spaced bearing means are provided between the spindle means and a stationary means, one of said bearing means being longitudinally slidably adjustable to cause displacement of the spindle means relative to the stationary means.

Still another object of this invention is to disclose and provide the above described means for mounting a spindle wherein said spaced bearing means include a roller bearing and a ball bearing and wherein spring means are positioned under compression between said bearing means for biasing one of the bearing means into selected position.

A further object of this invention is to disclose and provide means for mounting a spindle wherein spaced bearing means include a fixed bearing, a movable bearing, a sleeve member between said bearings and a spring between said bearings acting against said movable bearing, and adjustable means for said movable bearing.

The invention also contemplates a means for effectively lubricating cooperative relation of a blade assembly and driven rotor shell.

A still further object of this invention is to provide a rotary pump which is simple in construction, durable and exceptionally efficient in its operation.

It is a general object of this invention to disclose and provide a rotary pump for use as a vacuum pump whereby a chamber may be rapidly and effectively evacuated to a pressure of approximately six millimeters of mercury.

Other objects of this invention will be readily apparent from the following description of the drawings in which an exemplary embodiment of this invention is shown.

In the drawings:

Fig. 1 is a longitudinal sectional view of a pump embodying this invention, the section being taken in the planes indicated by line I—I of Fig. 2.

Generally speaking, a rotary pump generally indicated at 10 embodying this invention may comprise a stationary casing means 11, a driven rotor means including a driven rotor shell 12 within the stationary casing means 11 and a blade assembly 13 rotatably mounted within the rotor shell 12 and supported from a spindle means 14 extending outwardly from the stationary casing means 11 on the side thereof opposite from the mounting of rotor shell 12. The blade assembly 13 is associated with the rotor shell 12 and with the stationary casing in a manner substantially the same as disclosed in said United States Letters Patent No. 2,001,011.

Figure 2:
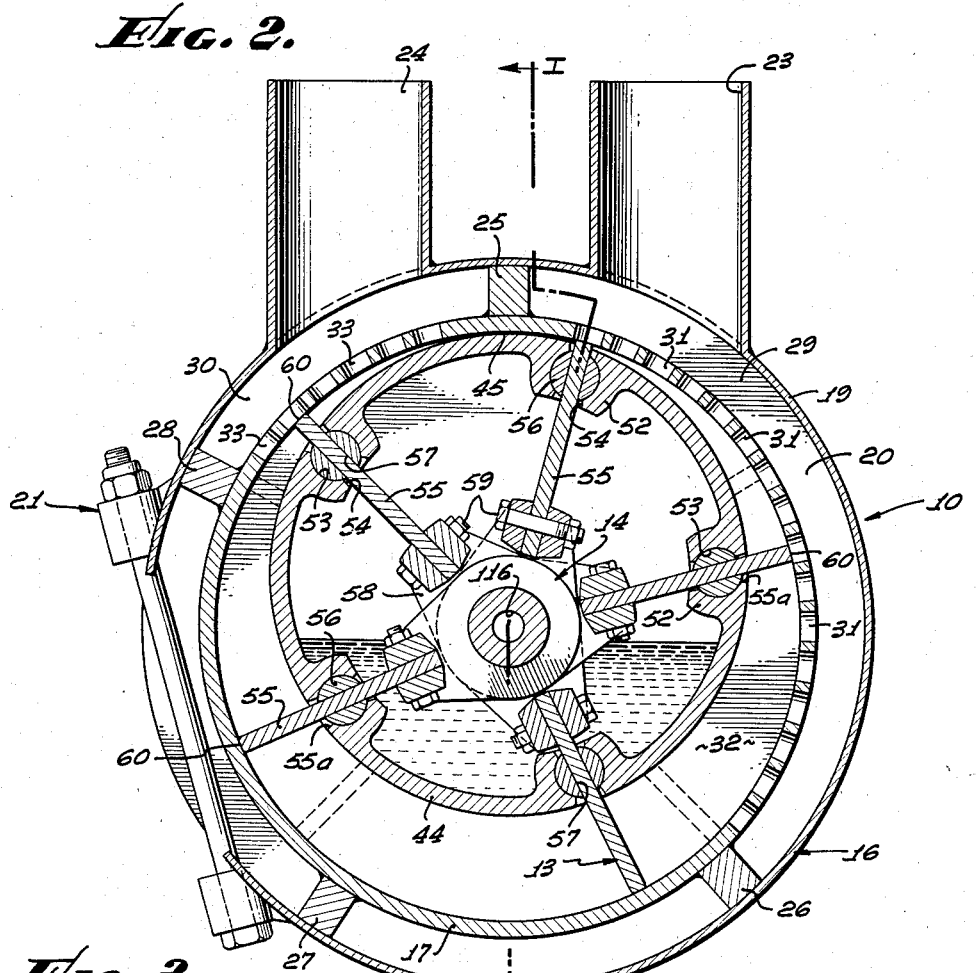
Fig. 2 is a transverse sectional view of the pump shown in Fig. 1, the section being taken in the plane indicated by line II—II of Fig. 1.
Figure 3:
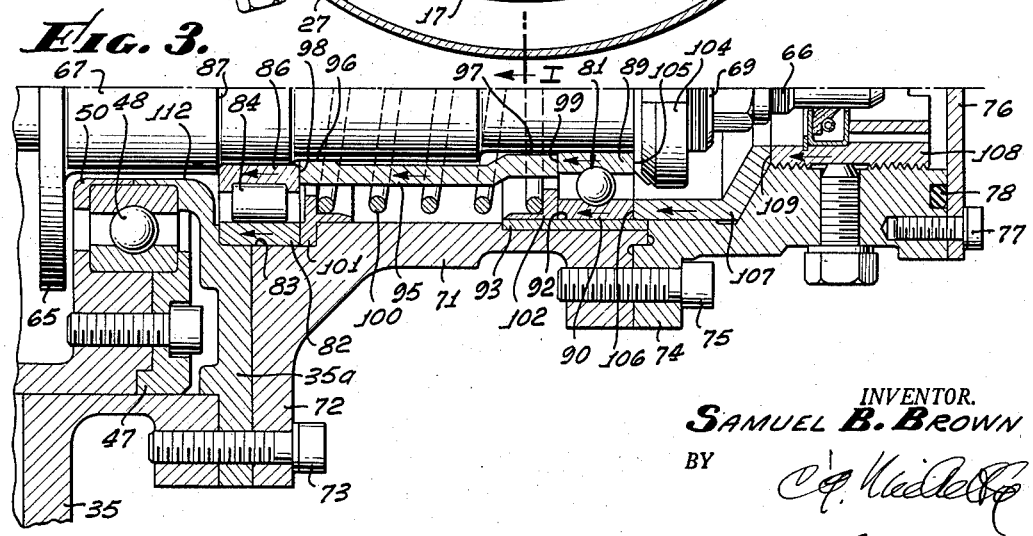
Fig. 3 is an enlarged fragmentary sectional view taken in a plane passing through the axis of the pump.

The parts of the rotary pump of this invention which are similar to the construction of the prior patent will be described briefly since they do not form a part of this invention. The stationary casing 11 may comprise a cylindrical middle section 16 including a cylindrical wall 17 having outwardly directed marginal flanges 18. On top of flanges 18 may be secured an outer cylindrical member 19 which defines with wall 17 an outer annular chamber 20. The member 19 may be tightly drawn against outer edge faces of flanges 18 by a suitable clamping means 21. Means providing an inlet port 23 (Fig. 2) and an outlet port 24 on member 19 afford communication with chamber 20. Between outlet and inlet ports may be a partition 25 secured as by welding to wall 17. Other circumferentially spaced partitions 26, 27 and 28 may also be provided, said partitions 26 and 28 defining with partition 25 an inlet plenum chamber 29 and an outlet plenum chamber 30.

The cylindrical wall 17 may be provided with a plurality of perforations 31 between partitions 25 and 26 for communication of fluid from inlet chamber 29 to the interior chamber 32 defined by cylindrical wall 17. Wall 17 may also be provided with perforations 33 between partitions 25 and 28 for communications between interior chamber 32 and outlet chamber 30.

Closing one end of the middle section 16 may be an end plate 34, and at the other end, may be an end plate 35. End plates 34 and 35 may be secured to middle section 16 as by means of bolts 36 extending through circumferential margins thereof and flanges 18 on wall 17. End plate 34 is provided with means eccentric to the axis of middle section 16 for rotatably mounting rotor shell 12. The rotor shell 12 may be provided with a suitable outwardly extending shaft 38 providing a seat for a roller bearing means 39 between the shaft 38 and the end plate 34. Suitable seal means 40 and 41 may be provided. The outer end of shaft 38 may include a tapered section 42 to provide connection to a suitable drive pulley.

The rotor shell 12 includes an end wall 43 integral with shaft 38 and a hollow cylindrical wall 44 extending substantially across the chamber of the middle section 16 and having an outer circumference which when eccentrically mounted within middle section 16 may slidably touch at top dead center at 45 the inner cylindrical surface of wall 17. The cylindrical wall 44 carries an annular bearing retainer ring 47 at its end opposite to wall 43 for positioning and mounting the outer race of a ball-bearing means 48. The inner race of said bearing means 48 may be carried by an inwardly extending boss 49 provided on closure plate 35a and by a bearing support ring 50 secured against plate 35a by stud bolts 51.

Cylindrical wall 44 may be provided with a plurality of circumferentially spaced longitudinally extending rocker seating means 52. In this example, five of such seating means are provided and each includes a longitudinally extending through bore 53 having an inner longitudinal slot 54 communicating with the interior shell 12 and an outer slot 55a providing communication to chamber 32. Each bore 53 is adapted to rotatably receive a cylindrical rocker member 56 provided with a through slot 57 for slidable reception therein of a flat generally rectangular blade 55 of blade assembly 13. It should be noted that the slots 54 and 55a are provided with diverging inwardly tapered sides to permit limited relative rotation of blades 55 with respect to the axis of the bores 53 and to eliminate binding between the blade, rocker member, and rocker seating means 52.

The blade assembly 13 may comprise a plurality of blades 55, each blade slidably associated with a rocker 56 and having its inner radial end pivotally mounted on spindle means 14. Blades 55 are pivotally connected to spindle means 14 by spaced hubs 58a, 58b, 58c and 58d, ported to receive therethrough the spindle means 14 and secured to inner radial margins of said blades as by nut and bolt assemblies 59. As shown in Fig. 1 hubs 58a, 58b, 58c and 58d are interleaved on said spindle means 14. Each blade 55 is of the same length and is provided with an outer radial edge 60 which meets the inner cylindrical surface of member 17 with only running clearance therebetween. The width of blades 55 is slightly less than the spacing between end wall 43 and the opposed inner edge face 62 of the cylindrical wall 44 so as to provide selected end clearance 63 therebetween.

The blades 55 assembled on spindle means 14 may be secured between blade retainer end plates 64 and 65, retainer plate 64 being connected to the inner end of an inner spindle member 66. End plate 65 is connected to an outer spindle member 67 which is sleeved over inner spindle member 66. End plates 64 and 65 may be drawn together to properly mount the blades 55 by nut means 68 threaded on the outer end of inner spindle member 66 and having abutment as at 69 against the outer end of spindle member 67.

The above described construction with the exception of inner and outer spindle members 66 and 67 of the spindle means 14 are generally similar to the pump construction disclosed in my said patent. The present invention is particularly directed to the mounting of spindle means 14 in stationary casing 11 so as to provide a convenient means for adjusting end clearance 63.

In this example stationary casing 11 carries a hollow cylindrical extension portion 71 provided with an eccentrically arranged flange 72 secured to closure plate 35a by bolts 73. At the outer end of extension portion 71 may be carried a hollow end section 74 secured to portion 71 by bolts 75. The end section 74 may carry a removable end cover 76 secured by bolts 77, said end cover 76 and said end section 74 being provided a seal as at 78.

A pair of space bearing means rotatably mounts spindle means 14 within extension portion 71, one of said bearing means being a longitudinally fixed roller bearing 80 and the other of said bearing means being a longitudinally adjustable ball bearing 81. Roller bearing 80 includes an outer race 82 fitted in a race seat 83 provided in extension portion 71 and end plate 35a. The outer race 82 presents an internal cylindrical surface coaxial to the axis of spindle means 14 against which roller bearings 84 of uniform diameter may rollingly contact and move longitudinally relative thereto as described later. The roller bearings 84 are retained by an inner race 86 seated on spindle member 67 in abutment against an outwardly facing shoulder 87 provided thereon. The spindle member 67 is progressively stepped and reduced in diameter towards the outer end thereof and provides a cylindrical portion 88 upon which may be seated an inner race 89 of ball bearing means 81. An outer race 90 of ball bearing means 81 may be slidably adjustably seated against an internal cylindrical face 92 provided on a cylindrical bearing ring 93 carried in an annular recess provided in the internal surface of extension portion 71.

Extending between corresponding inner races 86 and 89 of bearing means 80 and 81 is a sleeve spacer member 95 sleeved over spindle member 67. The sleeve member 95 may be provided with internal end seats 96 and 97 for contact with spindle member 67. End faces of spacer member 95 contact as at 98 and 99 the opposed faces of the inner race members 86 and 89.

Encircling sleeve spacer member 95 may be a coil spring 100 held under compression. One end of spring 100 may be seated against an internal flange 101 secured in recess 83 against outer race 82 of roller bearing 80. The other end of spring 100 may be seated against an internal flange 102 slidably positioned on bearing ring 93, said flange 102 being in abutment with opposed edge face of the outer race 90 of ball bearing means 81.

The inner race 89 of the ball bearing means 81 may be positioned on spindle member 67 by an adjustable nut 104 threaded on threaded outer end of spindle member 67, said nut 104 having an annular inner face in abutting engagement as at 105 with inner race 89. It will be apparent that nut 104 in contact with the inner race 89 positively positions sleeve member 95 and inner race 86 in tight metal-to-metal contact between shoulder 87 and nut 104 and that said races will move with the outer spindle member 67.

Outer race 90 of ball bearing means 81 is provided with an outer edge face in contact as at 106 with a cup-shaped, hollow, force-transmitting element 107. The cup-shaped element 107 partially encloses nut 104 and extends outwardly therefrom for contact as at 109 with an adjustment socket nut 108. Adjustment nut 108 is provided threaded engagement with end section 74 and is readily accessible by removing end cover 76. Nut 108 is hollow and may partially receive the outer end of inner spindle member 66. A seal 110 between adjustment nut 108 and the outer end of inner spindle member 66 may be provided in an internal recess in nut 108 and a resilient sealing member 111 carried by inner spindle member 66.

To adjust end clearance 63 by the construction described above, it should first be noted that nut 104 is first tightened to position and to provide metal-to-metal contact between said nut 104, inner race 89, sleeve member 95, inner race 86 and shoulder 87 on the outer spindle member 67. Outer spindle member 67 extends through an opening 112 in end plate 35a. When end cover 76 is removed, tightening of adjustment nut 108 will drive the force-transmitting, cut-shaped element 107 inwardly and will cause said outer race 90 of the ball bearing means 81 to move inwardly. The longitudinally inwardly directed forces thus imposed upon the ball bearing means 81 are transmitted through the balls of said bearing means to inner race 89. Since the inner race 89 is immovably positioned on the outer spindle means 67, such axial directed force will urge the spindle means 14, together with the blade assembly 13 carried thereby axially with respect to rotor shell 12 and with respect to stationary casing means 11 and its extension portion 71. Such transmission of longitudinally directed forces through the ball bearing means 81 occurs because each ball is seated in an annular groove in each of said races 89 and 90. Such axial movement serves to further compress the coil spring 100 and since roller bearings 84 are retained by inner race 86, surfaces of said roller bearings in contact with the internal cylindrical surface on the outer race 82 of the roller bearings will permit said roller bearings to slide longitudinally thereon.

When it is desired to adjust end clearance 63 by causing spindle means 14 and the blade assembly carried thereby to move outwardly (in the direction opposite to that described above) with respect to rotor shell 12 and stationary casing means, adjustment means 108 may be turned in the reverse direction relieving pressure on outer race 90 of the ball bearing means. As said pressure is relieved, coil spring 100 urges said outer race 90 outwardly and the spring forces are transmitted through the balls of the ball-bearing means to inner race 89 and nut 104 to cause the spindle means 14 to longitudinally move outwardly to the extent permitted by positioning of adjustment nut 108.

It will thus be readily apparent to those skilled in the art that novel means have been provided for conveniently and readily adjusting end clearance between a non-longitudinally movable casing means and a rotatable means cooperatively related thereto. This spaced arrangement of bearing means, one being capable of transmitting longitudinal loads in this manner thus provides a simple adjustable effective construction for this purpose.

Means are provided for lubricating the rotary pump described above. In this example a lubricant inlet 114 may be provided in end section 74 to introduce lubricant through a passageway 115 to the interior of hollow nut 108. The seal 78 between end plate 76 and end section 74 prevents leakage or escape of lubricant. The seal 111 may permit lubricant to flow therefrom to the interior of the element 107, to ball bearings 81, to the roller bearings 80, and thence through opening 112 into the internal chamber provided by a rotor shell 12.

Another passageway for lubricant is provided by an axially extending bore 116 provided in the inner spindle member 66, said bore 116 terminating in a plurality of longitudinally spaced ports 117 which provide communication through inner spindle member 66 and outer spindle member 67 between blade retainer plates 64 and 65. In normal operation the interior of rotor shell 12 is partially filled with lubricant so that as the rotor shell and associated blades are driven in rotation lubricant is carried to each cylindrical rocker means 56 to not only lubricate relative rotation of said rockers with respect to the cylindrical wall 44 but to lubricate reciprocal movement of the blades 55 in the slots 54. In addition, the pivotal mounting of the blades upon the outer spindle member 67 between the end plates is lubricated. It is understood that some lubricant may find its way into the cylindrical chamber defined by wall 17 and that in said chamber said lubricant will serve to lubricate running clearance between the outer edges of blades 55 and the internal cylindrical surfaces of wall 17. Preferably, the lubricant employed, may be a highly viscous fluid.

The embodiment of this invention described above includes a design for utilizing the pump as a vacuum pump to evacuate fluid such as air or gas from a container. In operation of the pump to perform this function the inlet port 23 may be connected to a container to be evacuated in any well known manner. Upon driving the rotor shell 12 in a clockwise direction by suitable power means not shown, the blades 55 associated with said shell and pivotally mounted on the spindle means 14 are driven likewise in a clockwise direction and with running clearance between the edges of the blade and the internal cylindrical surface of the wall 17. As each blade sweeps past the inlet ports 31 in wall 17 fluid is sucked therethrough into interior chamber 32. The blades sweep said fluid beneath the rotor shell 12 and discharge said fluid through the outlet perforations 33 and into the outlet plenum chamber 30 and finally to the outlet port 24.

It will be apparent that since the axis about which the blades rotate is eccentric to the axis about which the rotor shell 12 rotates that blades 55 will move radially and angularly between the rocker seat means 52 and the cylindrical rocker members 56. It will be noted that the rotor shell 12 is partially filled with lubricating oil and that during rotation of said blades the lubricating oil serves to maintain proper lubrication of the rocker members 56 in their rocker seats 53 and also serves to lubricate the reciprocal sliding movement of the blade members 55 with the rocker members. Lubrication is also provided between the hubs of the blades and the spindle means. The result is a freely rotatable, completely lubricated rotatable means operable within the stationary cylindrical casing 11. It will be readily understood that the rotary pump described above can also be used as an efficient effective liquid pump, a compressor pump or a rotary engine.

It will thus be readily apparent to those skilled in the art that the rotary pump embodying the improved construction described above is a highly efficient effective pump particularly adaptable for use as a vacuum pump and readily adaptable for use as a fluid pump or compressor. It is understood that various other modifications and changes may be made in the example described and all such modifications and changes coming within the scope of the appended claims are embraced thereby.

I claim:

1. In an apparatus as described the combination of: a stationary means including a hollow elongated portion having an axis; a rotatable means including a spindle means coaxial with said hollow portion; means to mount said rotatable means and said stationary means for movement relative to each other in an axial direction comprising a roller bearing means having an inner race fixed to said spindle means, a ball bearing means having an outer race slidable on said hollow portion and an inner race fixed to said spindle means; a rigid spacer member extending between inner races of said roller bearing means and said ball bearing means to transmit axially directed forces therebetween; a spring means under compression between outer races of said bearing means to position said outer race of said ball bearing means; and selective adjustment means for said ball bearing means including an adjustment element in contact with the outer race of said ball bearing means.

2. In an apparatus as described, the combination of: a non-rotatable means including a hollow portion; a rotatable means including spindle means within said hollow portion in coaxial relation thereto; means to mount said rotatable means and said non-rotatable means for movement relative to each other in an axial direction comprising a first bearing means between said spindle means and hollow portion and having inner and outer races fixed relative thereto; a second bearing means spaced from said first bearing means and having an inner race fixed to said spindle means and an outer race slidable in said hollow portion; a spacer sleeve extending between said inner races to transmit axially directed forces therebetween in one direction; a spring means under compression and ensleeved over said spacer sleeve and having one end cooperable with the outer race of said second bearing means to transmit axial force in the opposite direction; and adjustment means for said second bearing means cooperable with the outer race of said second bearing means.

3. An apparatus as described in claim 2 wherein the outer race of said first bearing means provides a surface for longitudinal displacement of a bearing element.

4. Means to axially adjust relative positions of a non-rotatable member and a rotatable member comprising: a first bearing means having one race fixed relative to one member and its outer race fixed relative to the other of said members and including bearing elements axially movable with respect to one race; a second bearing means comprising one race slidable with respect to one of said members and its other race fixed to the other of said members, the said one race of the first bearing means and the slidable race of the second bearing means being associated with the same member; a rigid spacer sleeve extending between said other races of said first and second bearing means to transmit axially directed forces therebetween in one direction; spring means under compression and cooperable with said slidable race to bias said race in one direction; and selective adjustment means carried by said one member cooperable with said slidable race of said second bearing means.

5. In an apparatus as described including in combination: a stationary means including a hollow portion having an axis; a rotatable means including a spindle means coaxial with said hollow portion; means to mount said rotatable means and said stationary means for movement relative to each other in an axial direction comprising a pair of longitudinally spaced bearing means having inner and outer races mounted on said spindle means and said hollow portion, one of said bearing means being adapted to transmit axially directed forces to cause relative movement between said spindle means and said stationary means; longitudinally adjustable means operatively connected with said one bearing means; a rigid spacer member extending between inner races of said spaced bearing means to transmit axially directed forces therebetween; and spring means under compression disposed between said spindle means and said hollow portion and acting against said one bearing means for maintaining selected axial adjustment thereof.

6. In an apparatus as stated in claim 5 wherein said spring means extends between the outer races of said spaced bearing means to position one of said outer races against said adjustable means.

References Cited in the file of this patent

UNITED STATES PATENTS

| | | |
|---|---|---|
| 1,335,040 | Burrows | Mar. 30, 1920 |
| 1,616,285 | Stern | Feb. 1, 1927 |
| 2,001,011 | Brown | May 14, 1935 |
| 2,129,431 | Lambin | Sept. 6, 1938 |
| 2,389,687 | Rickenmann | Nov. 27, 1945 |
| 2,523,983 | Arms | Sept. 26, 1950 |
| 2,719,763 | Bamford | Oct. 4, 1955 |